Aug. 14, 1923.
L. E. UTTER ET AL
1,465,103
TRAILER TRUCK
Filed Jan. 2, 1918
2 Sheets-Sheet 1
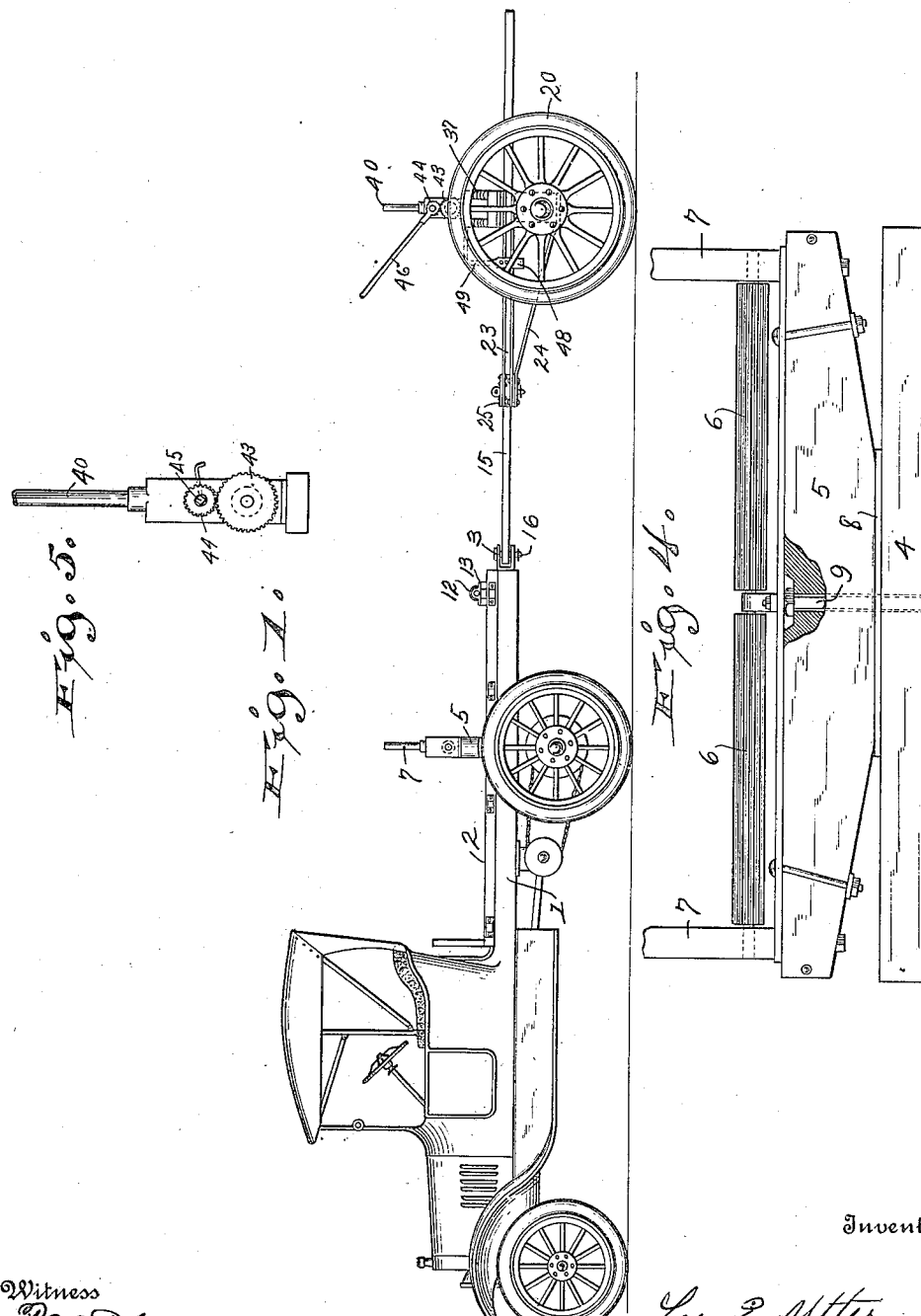

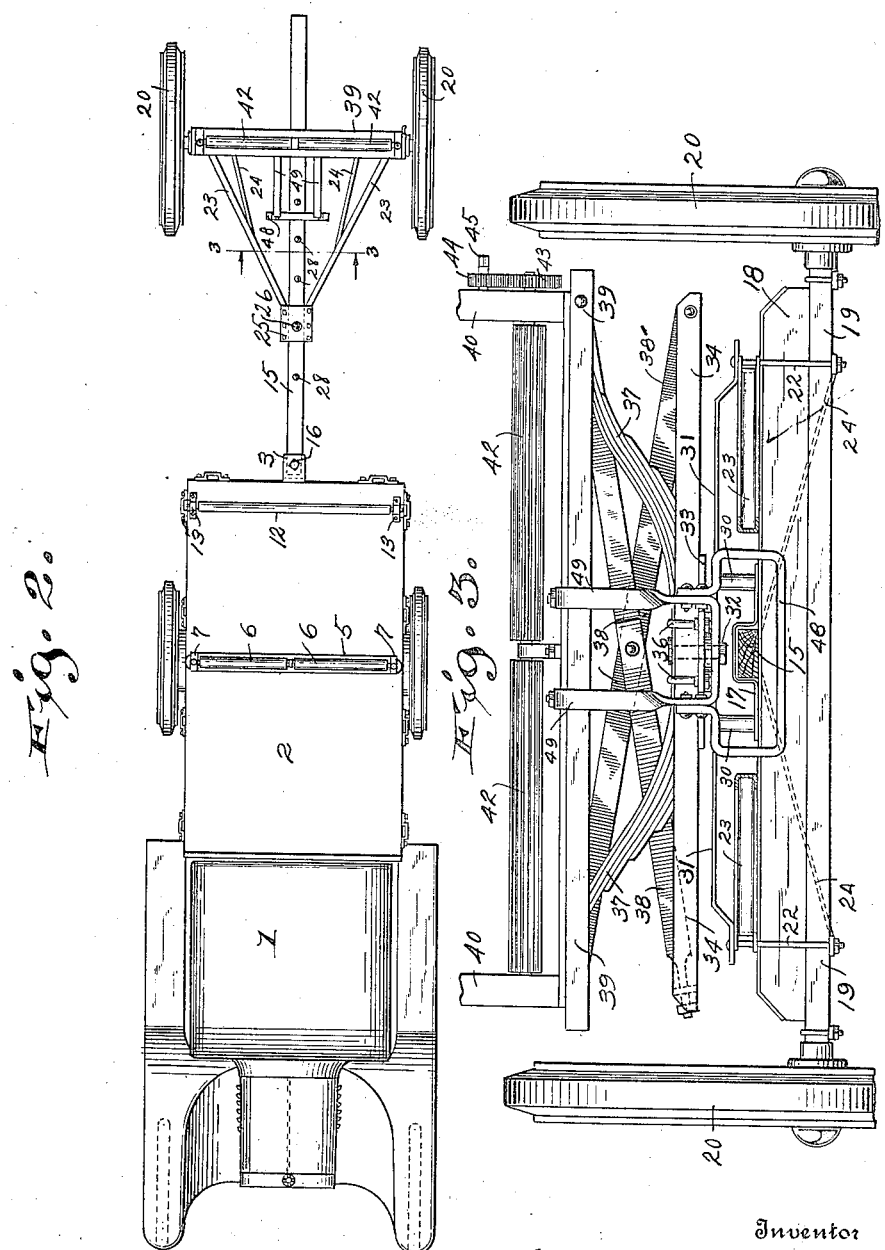

Patented Aug. 14, 1923.

1,465,103

UNITED STATES PATENT OFFICE.

LEE E. UTTER AND RALPH E. HOWLAND, OF NASHOTAH, WISCONSIN, ASSIGNORS TO TRAILER TRUCK COMPANY, OF NASHOTAH, WISCONSIN, A COPARTNERSHIP.

TRAILER TRUCK.

Application filed January 2, 1918. Serial No. 209,902.

*To all whom it may concern:*

Be it known that we, LEE E. UTTER and RALPH E. HOWLAND, citizens of the United States, residing at Nashotah, county of Waukesha, and State of Wisconsin, have invented new and useful Improvements in Trailer Trucks, of which the following is a specification.

Our invention relates to trailers of the type designed to increase the length of a truck by providing an ordinary four wheeled vehicle having a truck platform, with a detachable extension adapted to be supported from the rear end of the main vehicle and from a trailing pair of auxiliary wheels.

The primary object of our invention is to provide means whereby the trailer wheels may be made to track properly when advancing along curved lines, and whereby such wheels may be properly guided when backing, and kept in the roadway even when backing around corners.

Another object of our invention is to provide a trailer of the class described which can be easily attached to any truck and which, when detached, will leave the truck platform free of obstructions.

A third object of our invention is to provide means to facilitate unloading a truck of the class described.

A fourth object of our invention is to provide means whereby tilting movements of the load over the bolster of the trailer may be prevented, thereby relieving the trailer from destructive twisting strains.

A fifth object of our invention is to combine the bolster of the trailer with a load supporting spring in such a manner that both may turn upon a central pivot bolt or king bolt having a vertical axis.

In the drawings:—

Figure 1 is a side elevation of our improved trailer as it appears when attached to a truck.

Figure 2 is a plan view of the same.

Figure 3 is a rear elevation.

Figure 4 is a front elevation of a unit which is fastened to the truck platform when the trailer is in use.

Figure 5 is a side elevation of the means for operating our unloading device.

A truck 1 having a bed or platform 2 is fitted with shackle 3 to which the reach of the trailer may be attached. On the platform 2 of the truck, we mount the bolster unit shown in Figure 4. It comprises a bed plate 4 which is pivoted by a vertical king bolt 9 to the bolster 5. A load supporting roller 6 is secured between the bolster stakes 7. A metal wear plate 8 is secured to the bolster 5, and interposed between it and the bed piece 4 and is made sufficiently strong to withstand strains. The whole unit is connected with the truck bed simply by the king bolt 9, and it may therefore be merely lifted from the platform 2 when the trailer is detached.

Near the rear end of the truck platform 2, we preferably provide a roller 12 having trunnions mounted in the two bearing members 13 fastened to the platform. This roller is depressed below the level of roller 6.

The trailer unit is constructed as follows: The reach 15 is pivoted by bolt 16 to shackle 3 and extends rearwardly therefrom. A strap 17 secures the reach to the axle tree 18 to which the metal axle 19 is bolted, and the wheels 20 are mounted upon the rigid axle 19. The bolts 22 which hold the axle also serve to tie the ends of the upper and lower hounds 23 and 24 respectively. At their front ends, the hounds are connected with a box member 25 which is longitudinally adjustable upon the reach, the pin 26 being adapted to pass thru member 25 and thru any one of a number of holes 28 in the reach to hold the trailer in the desired position of longitudinal adjustment. It is of course understood that the trailer may be adjusted at any point along the reach 15 and that any length of reach may be used in certain positions of adjustment. The reach may not extend behind the trailer.

Above the axle, the spacing members 30 carry a rotatable bearing plate 31 which is pivoted by bolt 32 to the upper bearing plate 33 which supports the bolster plate 34. Clips 36 secure a transverse spring 37 to this bolster plate. The springs 37 support the bolster bar 39, and an equalizing bar 38 is pivoted to this bar 39 at one end, with the other end in sliding connection with the plate 34. Another equalizing bar 38′ is pivoted to the plate 34 and has sliding connection with the bar 39 above the sliding end of bar 38. At the central crossing point these bars 38 and 38′ are pivotally connected with each other. The bolster stakes 40 are supported from frame member 39 by a special rigid plate 41, and are journaled to receive the shaft of rollers 42. A gear wheel 43 is mounted on the end of the roller shaft and meshes with gear 44 which is supported from the bolster stake. The squared shaft end 45 is adapted to be actuated by a removable lever 46, (Figure 1), for the purpose of turning the rollers 42 by means of gears 43 and 44.

To counteract the tendency of the upper part of the bolster to tilt forwardly or backwardly, we provide the rectangular yoke 48 which is carried by two supports 49. The reach passes thru yoke 48, thus limiting the vertical movement of the yoke, while permitting a certain degree of lateral movement of the reach when the trailer is turning a corner.

In use, our improved trailer operates as follows: The front bolster unit of the trailer is preferably mounted directly above the rear axle of the main truck. If the load is such that the small roller 12 will be needed, it is positioned at the rear end of the truck platform below the level of the bolster rollers. The reach of the trailer is then connected to the rear end of the truck platform and the wheel base or distance between the rear wheels of the truck and those of the trailer is adjusted to the desired length by moving the trailer axle backward or forward along the reach until pin 26 registers with a suitable hole 28 in the reach. The hounds 24 and 23 and the frame or yoke 48 supported by arms 49 will hold the trailer upright in position to receive the load, the latter resting upon the rollers 6 and rollers 42 on the main truck and trailer respectively. The truck, with trailer attached, is adapted to receive and carry a wagon box or a load of lumber or any other load capable of being supported on these rollers. If lumber or the like is carried, it may be unloaded without effort by using handle 46 to rotate roller 42, thus causing the load to roll rearwardly. When the front end of the lumber leaves roller 6, it will be received by roller 12 which is low enough so that it does not ordinarily touch the load, except at times of unloading and so will not frictionally contact with the load when corners are being turned. By the time the load leaves roller 12, its center of gravity will be past roller 42 and it will gradually tilt and slide to the ground over the trailer.

When the load to be carried is of such a character that the rollers are not needed they may be omitted and the front and rear bolsters used like those of any wagon. But the advantage of providing rollers for use when needed in an assemblage of this kind is obvious.

When the truck and trailer turn a corner, the load, pivoted on bolts 9 and 32 at the front and rear, adopts the position of a chord to the circle transcribed by the wheels. It will be noted that the spring 37 of the trailer is a part of the bolster, and that inasmuch as the latter is rotatably mounted on the plate 31, the spring is relieved from the torsion which would result if it were secured to the axle. The bolster is free to turn within the limits allowed by the yoke or frame 48, and this frame is made of sufficient length to permit any necessary relative turning movement of the bolster when the truck passes around corners. Hence, altho the device operates substantially as a six wheeled truck, there is no binding or cramping at corners. When it is desired to use the truck without the trailer, the latter with its parts that are mounted on the truck proper may be detached in a very short time, leaving the truck free from encumbrances.

We claim:

1. A two-wheeled trailing attachment for trucks having an axle provided with a forwardly projecting reach, in combination with a bolster centrally pivoted to swing about a vertical axis, said bolster having a spring supported load carrying bar provided with a depending yoke, which loosely embraces the reach, and is adapted to limit forward and back tilting movements of said bar, without interfering with normal oscillatory movements of the bolster about said vertical pivot axis.

2. A two wheeled trailing attachment for trucks having an axle provided with a forwardly projecting reach, in combination with a bolster centrally pivoted to swing about a vertical axis, said bolster having a spring supported load carrying bar provided with a depending member, loosely engaged with a relatively stationary portion of these structures, and adapted to limit forward and back tilting movements of said bar, without interfering with normal oscillatory movements of the bolster about said vertical pivot axis, said spring supporting bar being provided with a superposed load carrying roller.

3. A truck and trailer structure, including the combination with a main truck, of a two wheeled trailing member having a reach bar pivotally and detachably connected with the main truck at a point between the trailer wheels and the rear wheels of the truck, a removable bolster having a central pivot bolt loosely socketed in the main truck platform, and adapted to permit the bolster to rotate on a vertical axis, the two wheeled trailer member being also provided with a rotatable bolster, and a yoke secured thereto and loosely embracing the reach bar, whereby tilting movements of the bolster are limited.

4. In a trailer attachment for trucks, the combination with the axle of the trailer of a spring supported bolster member, and a reach having slotted bearing connection with the axle, below the bolster member, and a yoke connected with the bolster and adapted to loosely embrace the reach.

In testimony whereof we affix our signatures in the presence of two witnesses.

LEE E. UTTER.
RALPH E. HOWLAND.

Witnesses:
 LEVERETT C. WHEELER,
 O. C. WEBER.